Patented Jan. 13, 1948

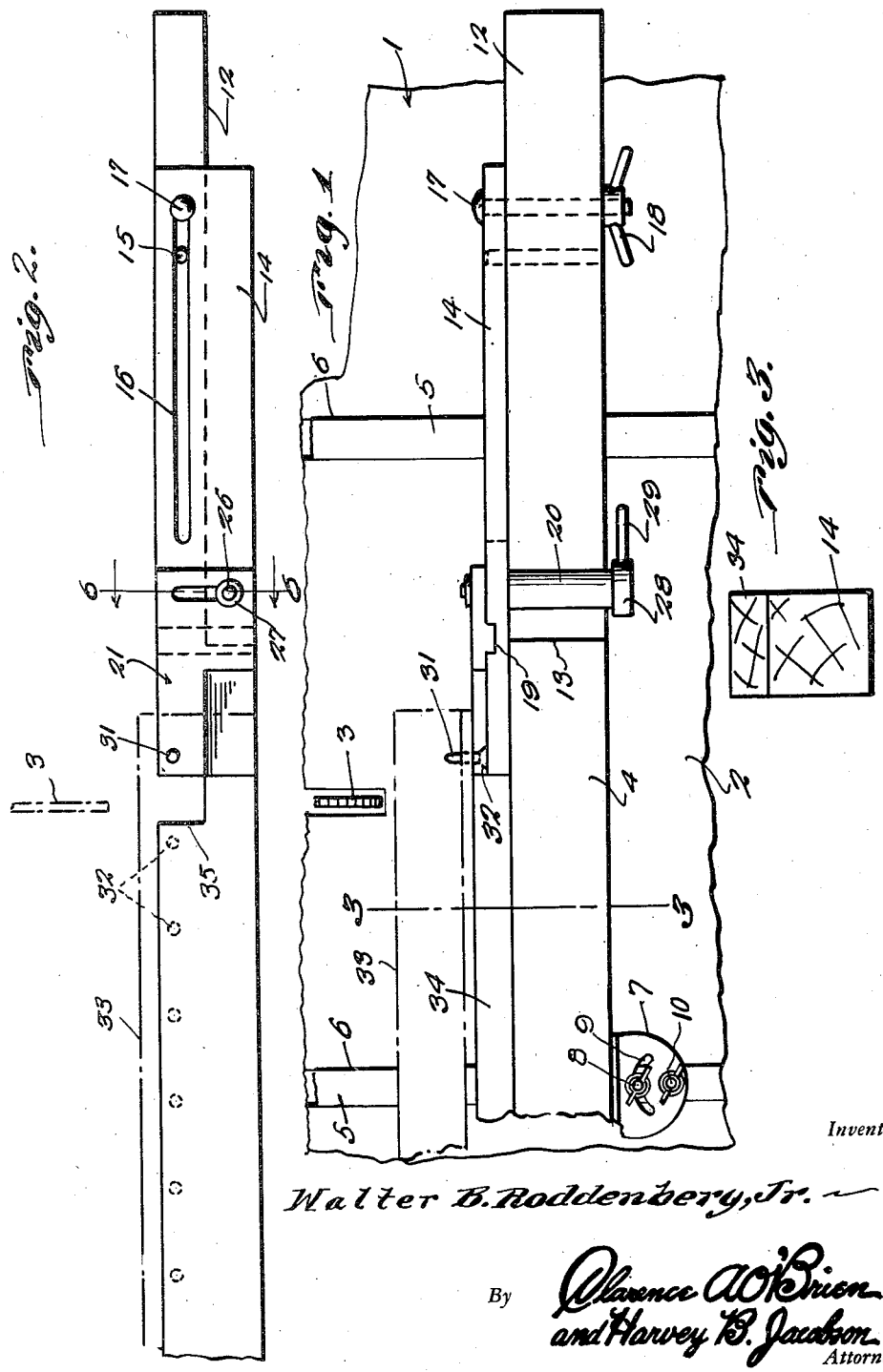

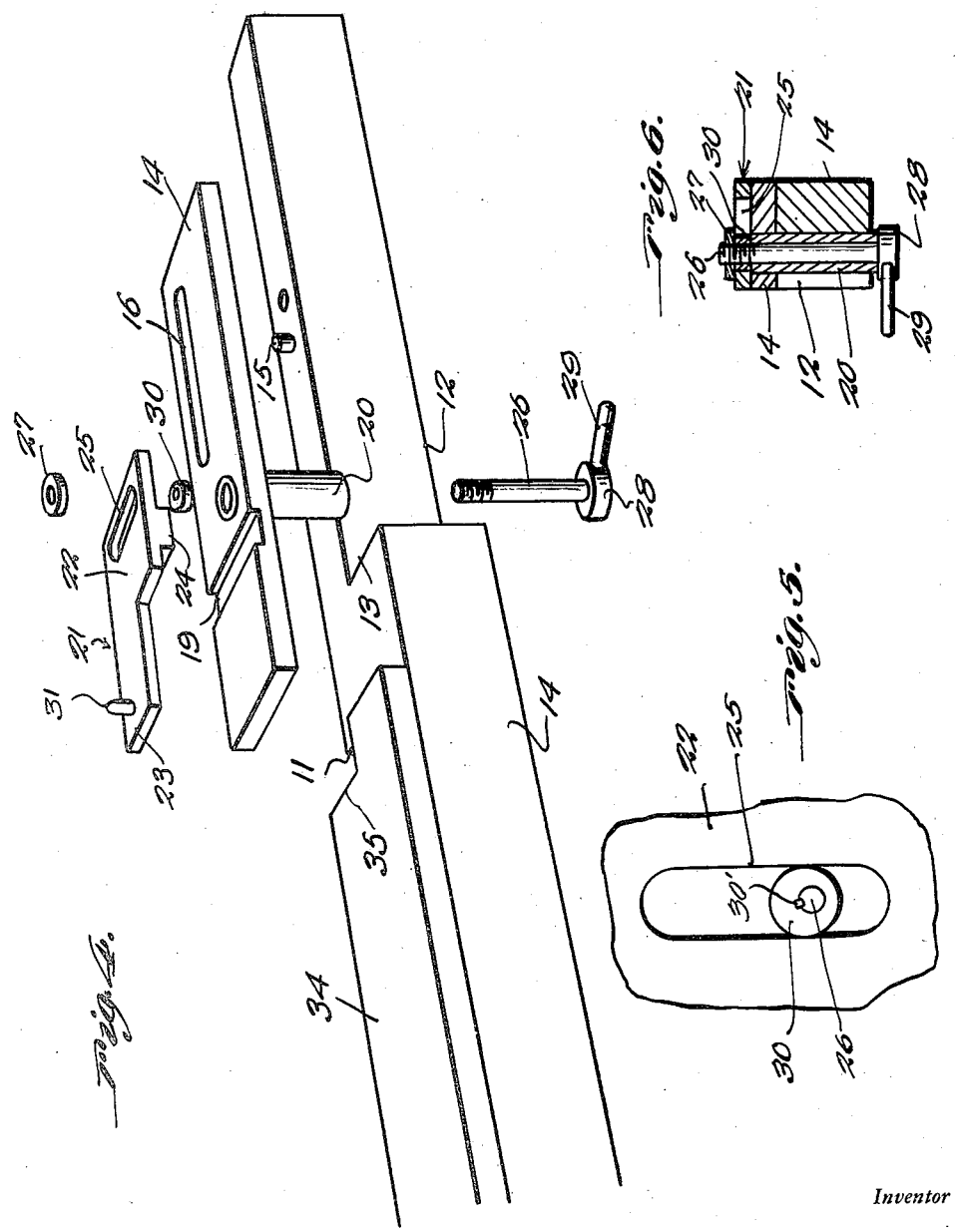

2,434,472

UNITED STATES PATENT OFFICE 2,434,472

LENGTH GAUGE FOR CROSSCUT SAWS

Walter B. Roddenbery, Jr., Marietta, Ga.

Application March 24, 1945, Serial No. 584,689

3 Claims. (Cl. 29—67)

My invention relates to improvements in length gauges for use on cross-cut rotary saws.

The primary object of my invention is to provide for such saws a length gauge especially adapted for use in cutting pierced strip stock of angle iron form into short lengths, utilizing the pierced holes in the stock in gauging the short lengths, so as to insure accuracy in gauging and uniformity as regards the lengths cut, and which is simple in construction, easy to operate, will not readily get out of order, and involves few parts inexpensive to manufacture and replace.

Other and subordinate objects also comprehended by my invention, together with the precise nature of my improvements and the advantages thereof, will become readily apparent when the following description and claims are read with reference to the drawings accompanying and forming part of this specification.

In said drawings:

Figure 1 is a fragmentary view in plan illustrating my improved length gauge in a preferred embodiment thereof applied to a cross-cut saw;

Figure 2 is a view in front elevation of the work feeding bar and parts carried thereby, with said bar and parts inverted;

Figure 3 is a view in transverse section taken on the line 3—3 of Figure 1;

Figure 4 is a view in perspective showing the parts disassembled;

Figure 5 is a fragmentary view in front elevation of the anchor plate;

Figure 6 is a view in transverse section taken on the line 6—6 of Figure 2.

Referring to the drawings by numerals, my improved length gauge has been shown therein, for the purpose of illustration, as applied to the "De Walt" saw of commerce for which it is especially designed, although, as will presently appear, it is adapted for use with other and various types of similar saws. Such saws, one of which is conventionally illustrated and designated by the numeral 1, embody a table 2 with a rotary disc saw 3 extending upwardly therethrough, and a work-feeding bar 4 extending crosswise of the blade 3 in front thereof and mounted on the table 2 for movement toward and from the blade 3 by means of guides 5 sliding in guideways 6. A bracket 7 having a pin and slot connection 8, 9 with one guide 5 and adapted to be clamped to said guide by a wing nut 10 connects the bar 4 to the one guide for swinging into different set positions over the table 2. The bar 4 is connected to the other guide 5 to compensate for such swinging thereof in a manner not shown since such details of the saw 1 form, per se, no part of the present invention. A bottom notch 11 in the bar 4 is provided for saw blade clearance.

According to my invention, the bar 4 at one end thereof, preferably the right hand end, is cut down from the top to provide an elongated flat-bottomed top recess 12 in said end of the bar terminating short of the notch 11 in a shoulder 13.

An elongated, rectangular gauge plate 14, preferably of metal, of the same width as the vertical thickness of the bar 4, is opposed flat against the leading edge of said bar, and which extends above the bottom of the recess 12 and endwise along said edge. A guide stud 15 in the leading edge of the bar 4, adjacent the right hand end thereof, extends into a longitudinal guide slot 16 in the lower edge portion of the gauge plate 14, and a bolt 17 extends through said slot 16 and said bar 4 in spaced relation to the stud 15 with a wing nut 18 thereon, whereby said gauge plate 14 is slidably adjustable endwise alongside said bar 4 toward and from the saw blade 3 into different set positions. A transverse, flat-bottomed guide groove 19 is provided in the front face of the gauge plate 14, between the guide slot 16 and the inner, front end of said plate, for a purpose presently seen. A bushing 20 having one end suitably fixed in and extending through said gauge plate 14, intermediate the guide slot 16 and the groove 19, extends rearwardly from said plate 14 across the recess 12 and out of the same for a purpose to be explained.

An elongated anchor plate 21 of metal and relatively shorter than the gauge plate 14 is opposed flat against the front face of said gauge plate. The anchor plate 21 is substantially L-shaped with a major part 22 of the same width as that of the gauge plate 14 and a reduced bottom tongue 23 terminating flush with the inner, front end of the gauge plate 14. A transverse rib 24 on said major part 22 of the anchor plate 21 spaced from the rear end of said plate and fitting in the guide groove 19 provides for vertical sliding of the anchor plate 21 on the gauge plate 14 in a straight line. A transverse slot 25 in the major part 22 of the anchor plate 21, in the rear of the rib 24, serves a purpose presently apparent.

A short, anchor plate locking shaft 26 extends through the bushing 20, and the slot 25 with a nut 27 threaded on one end thereof for turning against the anchor plate 21, and a head 28 on the other end thereof adapted to bear against the free end of said bushing 20 and provided with a handle 29. A disc cam 30 is suitably fixed, as by a key 30', on the shaft 26 and which fits in the slot 25 of the anchor plate 21, so that when said shaft 26 is rotated slightly, said cam is caused to bind aaginst a side of the slot 25 and lock the anchor plate 21 against vertical sliding adjustment. An anchor pin 31 with a bullet nose-like end extends forwardly from the tongue 23 adjacent the front end and bottom edge thereof, said pin being removably mounted in said tongue for replacement by one of a different diameter. Preferably, the pin 31 is provided with a screw-type head 32 and is inserted forwardly through a suitable aperture, not shown, in the tongue 23 so that it is retained in place by the gauge plate 14.

The pin 31 is designed to fit in pierced holes 32, of a given size, aligned in a row in one flange of a strip of stock 33 of angle iron form, such as shown in dot-and-dash lines in Figure 1.

A liner strip 34 is secured, in any suitable manner, to the leading edge of the bar 4 to extend along the same flush with the anchor plate 21 to the notch 11 and is provided with an end notch 35 registering with and serving the same purpose as the notch 11.

Referring now to the use and operation of the described length gauge. A dummy, or sample, length of the stock to be cut and which corresponds in length to the length to be cut off of a strip of stock 33 is placed in front of the liner 34 against the same with the pierced hole adjacent one end thereof hooked over the pin 31. The shaft 26 is turned by means of the handle 29, to disengage the cam 30 from the side of the slot 25 to thereby unlock the anchor plate 21. The anchor plate 21 is next adjusted downwardly on the gauge plate 14 until the sample length rests flat on the table 2. This adjusts the pin 31 for alignment with the row of holes 32 in the strip 33 to be cut into lengths. The anchor plate 21 is now locked in a manner which will be understood. The wing nut 18 is next loosened and the gauge plate 14 adjusted, to the right as viewed in Figures 1 and 2, to pull the dummy length to the right of the plane of the saw blade 3. The bar 4 is then operated, manually, toward the saw blade 3 until the dummy length of stock is opposite the right hand side of said blade. The gauge plate 14 is next adjusted toward the left, as viewed in Figures 1 and 2, until the opposite end of the dummy length abuts the right hand side of the saw blade 3. The wing nut 18 is then tightened to lock the gauge plate in this last adjusted position. In said last adjusted position, the pin 31 is set relative to the saw blade 3 so that by hooking holes 32 of the strip of stock 33 over the same, lengths of the stock may be cut therefrom corresponding to the length of the sample or dummy strip. It has not been deemed necessary to illustrate the dummy, or sample, strip, since such devices and similar uses thereof are well known in the art.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. The combination with a saw table, a saw blade extending therethrough, and a work-feeding bar movable over the table toward and from said saw blade and having a leading edge, of means for predetermining lengths to be cut from a work strip having a row of pierced apertures therein comprising an anchor plate provided with a lateral pin for entering said apertures, and means to mount said plate on said edge of said bar adjacent one end thereof for adjustment vertically and longitudinally into different set positions comprising a gauge plate adjustable along said edge of said bar, means slidably connecting the anchor plate to the gauge plate for vertical adjustment in a straight line, and means for locking said anchor plate in adjusted position.

2. The combination with a saw table, a saw blade extending therethrough, and a work-feeding bar movable over the table toward and from said saw blade and having a leading edge, of means for predetermining lengths to be cut from a work strip having a row of pierced apertures therein comprising an anchor plate provided with a lateral pin for entering said apertures, and means to mount said plate on said edge of said bar adjacent one end thereof for adjustment vertically and longitudinally into different set positions comprising a gauge plate adjustable along said edge of said bar, means slidably connecting the anchor plate to the gauge plate for vertical adjustment in a straight line, and means for locking said anchor plate in adjusted position including a bushing extending laterally from said gauge plate, a shaft rotatable in said bushing, a slot in the anchor plate through which said shaft extends, and a cam on said shaft for engagement with a side of the slot by rotation of the shaft.

3. The combination with a saw table, a saw blade extending therethrough, and a work-feeding bar movable over the table toward and from said saw blade and having a leading edge, of means for predetermining lengths to be cut from a work strip having a row of pierced apertures therein comprising an anchor plate provided with a lateral pin for entering said apertures, and means to mount said plate on said edge of said bar adjacent one end thereof for adjustment vertically and longitudinally into different set positions comprising a gauge plate adjustable along said edge of said bar, means slidably connecting the anchor plate to the gauge plate for vertical adjustment in a straight line, and means for locking said anchor plate in adjusted position including a bushing extending laterally from said gauge plate, a shaft rotatable in said bushing, a slot in the anchor plate through which said shaft extends, and a cam on said shaft for engagement with a side of the slot by rotation of the shaft, said bar having a recess therein through which the bushing extends to the edge of the bar opposite said leading edge, said shaft having a handle therein alongside said opposite edge.

WALTER B. RODDENBERY, Jr.

REFERENCES CITED

The following references are of record in the file of this patent:

UNITED STATES PATENTS

| Number | Name | Date |
|---|---|---|
| 1,273,235 | Lamphere | July 23, 1918 |
| 1,424,911 | Jones | Aug. 8, 1922 |
| 1,630,328 | Brumbach | May 31, 1927 |
| 2,285,897 | Campbell | June 9, 1942 |